(12) United States Patent
Ku et al.

(10) Patent No.: US 8,384,834 B2
(45) Date of Patent: Feb. 26, 2013

(54) ELECTRONIC IMAGING DEVICE AND DRIVING METHOD THEREOF

(75) Inventors: Ja-Seung Ku, Yongin (KR); Beom-Shik Kim, Yongin (KR); Hui Nam, Yongin (KR); Chan-Young Park, Yongin (KR); Hyoung-Wook Jang, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 477 days.

(21) Appl. No.: 12/656,263

(22) Filed: Jan. 22, 2010

(65) Prior Publication Data

US 2010/0271346 A1 Oct. 28, 2010

(30) Foreign Application Priority Data

Apr. 23, 2009 (KR) ........................ 10-2009-0035566

(51) Int. Cl.
*G02F 1/1335* (2006.01)
*G02F 1/1347* (2006.01)
(52) U.S. Cl. .......................................... 349/15; 349/74
(58) Field of Classification Search .................. 349/15, 349/73–74
See application file for complete search history.

(56) References Cited

U.S. PATENT DOCUMENTS

| 7,557,871 | B2 * | 7/2009 | Matsumoto et al. | 349/15 |
| 8,045,070 | B2 * | 10/2011 | Park et al. | 349/15 |
| 8,125,581 | B2 * | 2/2012 | Kim et al. | 349/15 |
| 2012/0038854 | A1 * | 2/2012 | Inoue | 349/96 |

FOREIGN PATENT DOCUMENTS

KR 10 2008-0060950 A 7/2008

* cited by examiner

*Primary Examiner* — Dung T. Nguyen
(74) *Attorney, Agent, or Firm* — Lee & Morse, P.C.

(57) ABSTRACT

An electronic imaging device includes a display unit having a plurality of scan lines, a plurality of data lines, and a plurality of pixels, and a barrier layer disposed in front of the display unit and divided into a plurality of areas along a scan direction. The barrier layer includes a plurality of first barrier electrodes and a plurality of second barrier electrode. The plurality of first barrier electrodes includes a plurality of first and second sub-electrodes in a zigzag pattern along the scan direction, the plurality of second barrier electrodes includes a plurality of third and fourth sub-electrodes in a zigzag pattern along the scan direction, and the third and fourth sub-electrodes being offset with respect to the first and second sub-electrodes along the scan direction.

19 Claims, 10 Drawing Sheets

ELECTRONIC IMAGING DEVICE AND DRIVING METHOD THEREOF

BACKGROUND

1. Field

Example embodiments relate to an electronic imaging device and a driving method thereof. More particularly, example embodiments relate to an electronic imaging device that displays a stereoscopic image, and a driving method thereof.

2. Description of the Related Art

An electronic imaging device that displays a stereoscopic image provides an image of which a viewer perceives a stereoscopic effect by providing different images to the left eye and the right eye of the viewer. Such an electronic imaging device may provide autostereoscopy that enables a viewer to view a stereoscopic image without wearing an aiding device, e.g., polarizing spectacles, by using binocular parallax.

A typical autostereoscopy device may include a display unit and a barrier unit disposed in front of the display unit. The display unit may divide pixels for the left eye and the right eye and display a left-eye image and a right-eye image together, and the barrier unit may divide the left-eye image and the right-eye image realized by the display unit respectively toward the left-eye direction and the right-eye direction of the viewer. A barrier unit provided with transparent electrodes and a liquid crystal layer may optically form a light blocking unit and a light transmitting unit.

A conventional display unit may divide one frame into first and second periods, and may display an image that is combined in an order of the left eye and the right eye along a horizontal direction of the screen during the first period, and display an image that is combined in an order of the right eye and the left eye during the second period. In addition, the barrier unit may be synchronized by driving of the display unit, and may change a location of the light transmission unit in the first period and the second period. This method is called a time-division driving method, and a stereoscopic image with resolution of a plane image may be realized through this method.

However, a display unit, e.g., a liquid crystal display (LCD) or an organic light emitting diode (OLED) display, may display images by using a plurality of scan lines and a plurality of data lines, so an image of the first period and an image of the second period may be sequentially displayed along a scan direction, e.g., sequentially displayed along a vertical direction. That is, the image of the second period may be displayed from a top of the display unit toward a bottom thereof, after the image of the first period is displayed along a same direction. Therefore, there may be a period in which portions of the image of the second period and the image of the first period are displayed simultaneously on the display unit. Since a left-eye image and a right-eye image cannot be divided while the image of the first period and the image of the second period are displayed together, i.e., simultaneously, by the display unit, crosstalk may be generated.

The above information disclosed in this Background section is only for enhancement of understanding of the background of the invention and therefore it may contain information that does not form the prior art that is already known in this country to a person of ordinary skill in the art.

SUMMARY

Embodiments are therefore directed to an electronic imaging device that displays a stereoscopic image and a method of driving the same, which substantially overcome one or more of the problems due to the limitations and disadvantages of the related art.

It is therefore a feature of an embodiment to provide an electronic imaging device with a barrier unit structure capable of improving quality of a stereoscopic image by suppressing generation of crosstalk.

It is therefore another feature of an embodiment to provide a method of driving an electronic imaging device with a barrier unit structure capable of improving quality of a stereoscopic image by suppressing generation of crosstalk.

At least one of the above and other features and advantages may be realized by providing an electronic imaging device, including a display unit having a plurality of scan lines, a plurality of data lines, and a plurality of pixels and a barrier layer disposed in front of the display unit and divided into a plurality of areas along a scan direction in which a scan line is transmitted to the plurality of scan lines. The barrier layer may include a plurality of first barrier electrodes disposed on a first layer and including a plurality of first and second sub-electrodes formed in a zigzag pattern along the length direction of the scan lines and a plurality of second barrier electrodes disposed on a second layer that is different from the first layer, and including a plurality of third and fourth sub-electrodes formed in a zigzag pattern and offset with respect to the first and second sub-electrodes along the length direction of the scan lines. Here, an overlapped area may be formed between the first barrier electrode and the second barrier electrode. The first sub-electrodes may be formed in a first row, and the second sub-electrodes may be formed in a second row that is adjacent to the first row. The plurality of first sub-electrodes and the plurality of second sub-electrodes disposed in a first area among the plurality of areas may be electrically connected to each other. The plurality of first sub-electrodes may be respectively formed with a predetermined first gap along the first row direction, and the plurality of second sub-electrodes may be respectively formed to contact corners of two corresponding first sub-electrodes among the plurality of first sub-electrodes and are separated from each other with the first gap along the second row direction.

The plurality of first sub-electrodes may be disposed in a second area that is adjacent to the first area among the plurality of areas, and the plurality of second sub-electrodes disposed in the first area may be electrically disconnected. Angular points of the plurality of second sub-electrodes in the first area may be formed to be concave in the shape of " ٦ " and " r ", and the angular points of the plurality of first sub-electrodes in the second area may be formed to be concave in the shape of " L " and " ┘ ". Angular points of the plurality of first sub-electrodes in the second area may be formed to be concave in the shape of " L " and " ┘ ". The angular points of the plurality of second sub-electrodes in the first area may be formed to be concave in the shape of " ٦ " and " r ". The plurality of third sub-electrodes may be formed in the first row, and the plurality of fourth sub-electrodes may be formed in the second row. The plurality of third sub-electrodes and fourth sub-electrodes in the first area among the plurality of areas may be electrically connected to each other. The plurality of third sub-electrodes may be respectively separated from each other with a predetermined second gap along the first row direction, and the plurality of fourth sub-electrodes may be respectively formed to overlap corners of two corresponding third sub-electrodes among the plurality of third sub-electrodes and may be separated from each other by the second gap along the second row direction. The plurality of third sub-electrodes located in a second area that is adjacent to the first area among the plurality of areas and the plurality of fourth sub-electrodes located in the first area may be electrically disconnected. Angular points of the plurality of fourth sub-electrodes in the first area and angular points of the plurality of third sub-electrodes in the second area may be formed in a step shape.

Angular points of the plurality of third sub-electrodes in the second area may be formed to be concave in the shape of "⌐" and "⌙". Angular points of the plurality of fourth sub-electrodes in the first area may be formed to be concave in the shape of "┐" and "┌". The barrier may include first and second substrates that face each other, interposing a first liquid crystal therebetween, a third substrate that faces the second substrate, interposing a second liquid crystal layer therebetween, a first common electrode formed over the entire bottom surface of the first substrate, and a second common electrode formed over the entire bottom surface of the second substrate. The plurality of first barrier electrodes may be formed on the upper surface of the second substrate. The plurality of second barrier electrodes may be formed on the upper surface of the third substrate.

At least one of the above and other features and advantages may also be realized by providing a driving method of an electronic imaging device with a display unit having a plurality of scan lines, a plurality of data lines, and a plurality of pixels, and a barrier layer disposed in front of the display unit, divided into a plurality of areas along a scan direction in which a scan signal is transmitted to the plurality of scan lines, and including a plurality of first barrier electrodes and a plurality of second barrier electrodes that are respectively located in different layers in each of the plurality of barrier areas and formed in an offset zigzag pattern along the length direction of the scan line. The driving method may include dividing a first period during which an image of one frame is displayed into at least two of second and third periods and alternately displaying a first stereoscopic image combined in a first order and a second stereoscopic image combined in a second order that is different from the first order in a plurality of display areas of the display unit, respectively corresponding to the plurality of barrier areas, during the second period, alternately displaying a third stereoscopic image combined in the second order and a fourth stereoscopic image combined in the first order in each of the plurality of display areas during the third period, and sequentially changing the plurality of barrier areas to non-transmission areas along the scan line in synchronization with an initial application time of the scan signal to a plurality of scan lines that respectively correspond to the barrier areas during the second and third periods.

The driving method may further include maintaining the display of the first and second stereoscopic images in each of the plurality of display areas between the second period and the third period, and areas of the barrier areas corresponding to the plurality of first barrier electrodes are changed to non-transmission areas during the maintaining of the display of the first and second stereoscopic images. In addition, the sequential changing of the plurality of barrier areas to the non-transmission areas along the scan direction in synchronization with the initial application of the corresponding scan signal during the second period includes changing areas that respectively correspond to the plurality of first barrier electrodes to the non-transmission areas in synchronization with the corresponding initial scan signal, and changing areas respectively corresponding to the plurality of second barrier electrodes to transmission areas in synchronization with initial scan signal corresponding to the next adjacent barrier area in the scan direction. The driving method may further include maintaining the displaying of the third and fourth stereoscopic images in each of the plurality of display areas between the third period and the frame following the frame, and areas of the plurality of barrier areas, corresponding to the plurality of second barrier electrodes, are changed to non-transmission areas while maintaining the displaying. During the third period, the sequential changing of the plurality of barrier areas to the non-transmission areas along the scan direction in synchronization with the initial application of the corresponding scan signal during the second period the third period may include changing areas respectively corresponding to the plurality of second barrier electrodes to non-transmission areas in synchronization with the initial scan signal corresponding to the barrier area, and changing areas respectively corresponding to the plurality of first barrier electrodes to transmission areas in synchronization with the initial scan signal corresponding to the next adjacent barrier area in the scan direction.

At least one of the above and other features and advantages may also be realized by providing a driving method of electronic imaging device including a display unit having a plurality of scan lines, a plurality of data lines, and a plurality of pixels, and a barrier layer disposed in front of the display unit, divided into a plurality areas along a scan direction in which a scan signal is transmitted to the plurality of scan lines, and including a plurality of first barrier electrodes and a plurality of second barrier electrodes that are respectively located in different layers in each of the plurality of barrier areas and formed in an offset zigzag pattern along the length direction of the scan line, the electronic imaging device dividing one frame at least into a first period and a second period for operation. The driving method may include during the first period, sequentially displaying a first stereoscopic image combined in a first order and a second stereoscopic image combined in a second order that is different from the first order in a plurality of first display areas respectively among a plurality of display areas corresponding to the plurality of barrier areas, during the first period, sequentially displaying a third stereoscopic image combined in the second order and a fourth stereoscopic image combined in the first order in a plurality of second display areas that are respectively adjacent to the plurality of first display areas in the scan direction, and during the first period, changing areas of a plurality of first barrier areas corresponding to the first display areas to non-transmission areas, the areas corresponding to the plurality of first barrier electrodes, and changing areas of a plurality of second barrier areas corresponding to the plurality of second display areas to non-transmission areas, the areas corresponding to the plurality of second barrier electrodes.

The driving method may further include, during the first period, sequentially changing the plurality of barrier areas to non-transmission areas in synchronization with an initial application time of the scan signal to the plurality of scan lines that respectively correspond to the plurality of barrier areas along the scan direction. The driving method may further include sequentially displaying a fifth stereoscopic image combined in the second order and a sixth stereoscopic image combined in the first order in each of the plurality of first display areas during the second period, sequentially displaying a seventh stereoscopic image combined in the first order and an eighth stereoscopic image combined in the second order in the plurality of second display areas during the second period, and changing areas of the plurality of first barrier areas, respectively corresponding to the plurality of second barrier electrodes to non-transmission areas, and changing areas of the plurality of second barrier electrodes, respectively corresponding to the plurality of first barrier electrodes to non-transmission areas, during the second period. The driving method may further include, during the second period, sequentially changing the plurality of barrier areas to non-transmission areas in synchronization with the initial application time of the scan signal to the plurality of scan signals that respectively correspond to the plurality of barrier areas.

BRIEF DESCRIPTION OF THE DRAWINGS

The above and other features and advantages will become more apparent to those of ordinary skill in the art by describing in detail'exemplary embodiments with reference to the attached drawings, in which.

DETAILED DESCRIPTION

Figure 1:
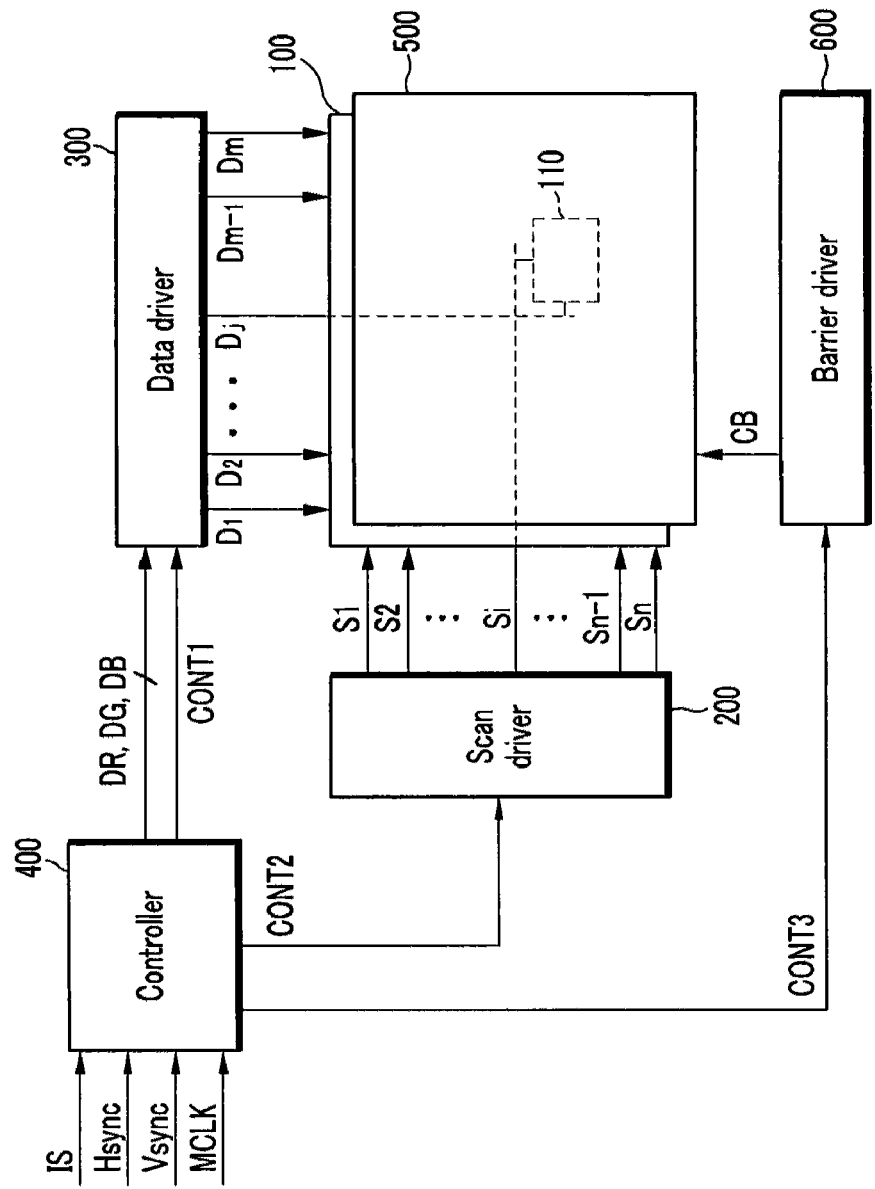
FIG. 1 illustrates a block diagram of an electronic imaging device according to an exemplary embodiment.

Korean Patent Application No. 10-2009-0035566, filed on Apr. 23, 2009, in the Korean Intellectual Property Office, and entitled: "Electronic Imaging Device and Driving Method Thereof," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "between" two layers, it can be the only layer between the two layers, or one or more intervening layers may also be present. In addition, it will also be understood that when a layer or element is described as "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements. Like reference numerals refer to like elements throughout.

Figure 2:
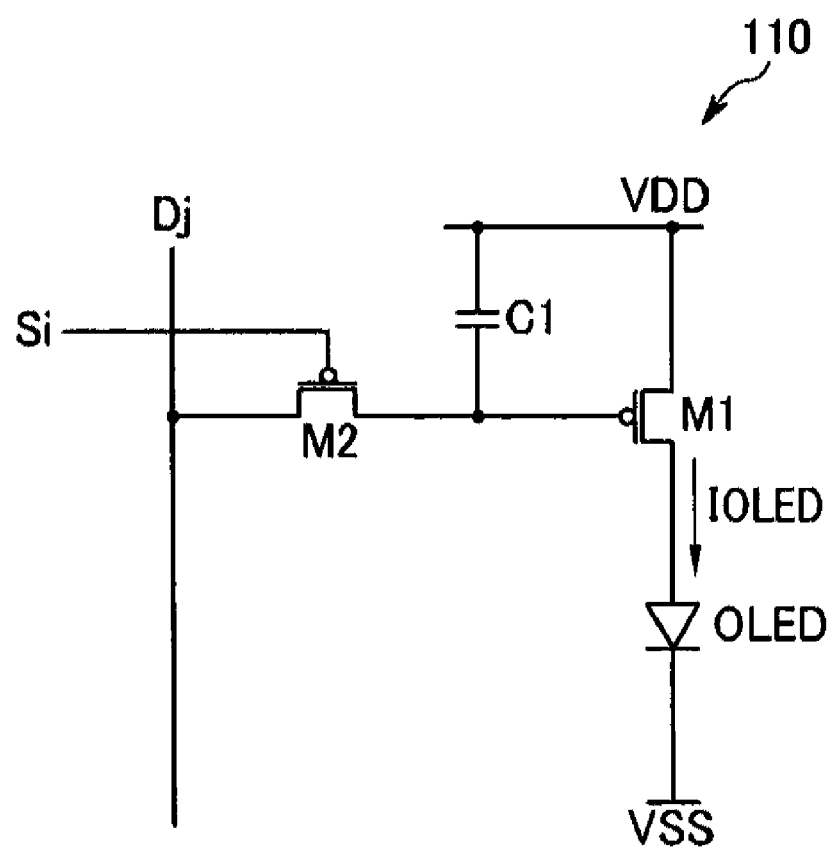
FIG. 2 illustrates an equivalent circuit diagram of one pixel of a display device of FIG. 1.

Hereinafter, an electronic imaging device according to an exemplary embodiment will be described. FIG. 1 illustrates a block diagram of an electronic imaging device according to an exemplary embodiment. FIG. 2 illustrates an equivalent circuit diagram of one pixel of the display device of FIG. 1.

Referring to FIG. 1, the electronic imaging device may include a display unit 100, a scan driver 200, a data driver 300, a controller 400, a barrier layer 500, and a barrier driver 600.

The display unit 100 may include a plurality of signal lines $S_1$ to $S_n$ and $D_1$ to $D_m$, and a plurality of pixels 110 connected to the plurality of signal lines. For example, the plurality of pixels 110 may be substantially arranged in a matrix format.

The signal lines $S_1$ to $S_n$ and $D_1$ to $D_m$ may include a plurality of scan lines $S_1$ to $S_n$ for transmitting scan signals, and a plurality of data lines $D_1$ to $D_m$ for transmitting data signals. The plurality of scan lines $S_1$-$S_n$ may substantially extend in a row direction, and may be substantially parallel with each other. The plurality of data lines $D_1$ to $D_m$ may substantially extend in a column direction, i.e., in a direction substantially perpendicular to the row direction, and may be substantially parallel with each other. The data signal may be a voltage signal (hereinafter referred to as a data voltage) or a current signal (hereinafter referred to as a data current) according to the type of pixel 110. For convenience, in the following description, the data signal will be described as a data voltage.

Referring to FIG. 2, a pixel 110 may be connected to the i-th (i=1, 2, ..., n) scan line $S_i$ and the j-th (j=1, 2, ..., m) data line $D_j$, i.e., each pixel 110 may be connected to corresponding data and scan lines. The pixel 110 may include, e.g., an organic light emitting element, a driving transistor M1, a capacitor C1, and a switching transistor M2.

The switching transistor M2 includes a control terminal, an input terminal, and an output terminal. The control terminal may be connected to the scan line $S_i$, the input terminal may be connected to the data line $D_j$, and the output terminal may be connected to the driving transistor M1. The switching transistor M2 transmits a data signal, i.e., a data voltage, applied to the data line $D_j$ corresponding to a scan signal applied to the scan line $S_i$.

The driving transistor M1 includes a control terminal, an input terminal, and an output terminal. The control terminal may be connected to the switching transistor M2, the input terminal may be connected to a driving voltage Vdd, and the output terminal may be connected to the organic light emitting element. The driving transistor M1 flows a current $I_{OLED}$ that varies according to a voltage between the control terminal and the output terminal thereof.

The capacitor C1 may be connected between the control terminal and the input terminal of the driving transistor M1. The capacitor C1 charges a data voltage applied to the control terminal of the driving transistor M1, and continues the charging of the data voltage after the switching transistor M2 is turned off.

The organic light emitting element may be an organic light emitting diode (OLED), and includes an anode connected to the output terminal of the driving transistor M1 and a cathode connected to a common voltage Vss. Hereinafter, the organic light emitting element will be referred to as an OLED. The OLED emits light with different intensities according to the output current $I_{OLED}$ of the driving transistor M1 in order to display an image.

The OLED may emit, e.g., one of primary colors. The primary colors include, e.g., three primary colors of red, green, and blue, and a desired color may be displayed with a spatial combination or a temporal combination of the three primary colors. In this case, the OLED may emit white light and thus luminance may increase. Alternatively, OLEDs of all pixels 110 may emit white light, and some pixels 110 may further include a color filter (not shown) that changes white light emitted from the OLED to one of the primary colors.

The switching transistor M2 and the driving transistor M1 may be p-channel field effect transistors (FET). In this case, the control terminal, the input terminal, and the output terminal respectively correspond to a gate, a source, and a drain. However, at least one of the switching transistor M2 and the driving transistor M1 may be an n-channel FET. Further, the connection relationship of the transistors M1 and M2, the capacitor C1, and the OLED may be changed.

The pixel 110 of FIG. 2 is an example of a pixel of the display device, and other pixel types, e.g., including at least two transistors or at least one capacitor, may be used. Further, as described above, a pixel that receives a data current as a data signal may be used.

Referring back to FIG. 1, the scan driver 200 may be connected to the scan lines $S_1$-$S_n$ of the display unit 100, and may sequentially apply scan signals to the scan lines $S_1$-$S_n$ according to a scan control signal CONT2. Each scan signal may include a combination of a gate-on voltage Von that may turn on the switching transistor M2 and a gate-off voltage Voff that may turn off the switching transistor M2. When the switching transistor M2 is a p-channel FET, the gate-on voltage Von and the gate-off voltage Voff may be at a low voltage and a high voltage, respectively.

The data driver 300 may be connected to the data lines $D_1$-$D_m$ of the display unit 100, and may convert input image data signals DR, DG, and DB input from the controller 400 to data voltages. The data driver 300 may apply the data voltages to the data lines $D_1$-$D_m$ according to a data control signal CONT1.

The controller 400 may receive an input signal IS, a horizontal synchronization signal Hsync, a vertical synchronization signal Vsync, and a main clock signal MCLK from the outside, and may generate the image data signals DR, DG, and DB, the data control signal CONT1, the scan control signal CONT2, and a barrier driving control signal CONT3. Here, the input signal IS may be general planar image data, stereoscopic image data including image data of each point of view, or both the planar image data and stereoscopic image data if planar and stereoscopic images may be displayed together on the display unit 100. In addition, the image data signals DR, DG, and DB may include an image data signal (hereinafter referred to as a stereoscopic image data signal) for a stereoscopic image and an image data signal (hereinafter referred to as a planar image data signal) for a planar image.

The barrier driver 600 may drive the barrier layer 500 according to the barrier driver control signal CONT3. The barrier layer 500 according to an exemplary embodiment may be divided into a plurality of areas, and may include a plurality of first barrier electrodes, e.g., first barrier electrodes 510_1 to 510_4, and a plurality of second barrier electrodes, e.g., second barrier electrodes 520_1 to 520_4, respectively formed in a double-layered structure including an upper layer and a lower layer. Each of the plurality of first and second barrier electrodes may be formed in a zigzag pattern, as will be described in more detail below with reference to FIGS. 4A-4C. Each of the plurality of first and second barrier electrodes may be driven to be a non-transmission area according to a time-division driving method. The electronic imaging device according to the exemplary embodiment may employ the time-division driving method for displaying a stereoscopic image. The barrier driver 600 may also be driven by the time-division method. Hereinafter, the time-division driving method according to the exemplary embodiment will be described with reference to FIG. 3A and FIG. 3B.

Figure 3A:
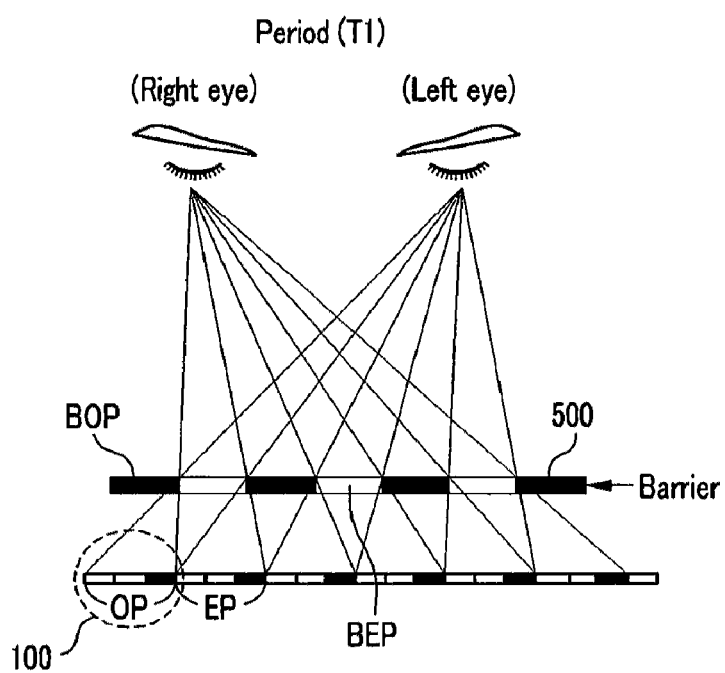
FIG. 3A and FIG. 3B illustrate time-division driving methods of a plane/stereoscopic image display device according to an exemplary embodiment.
Figure 3A:
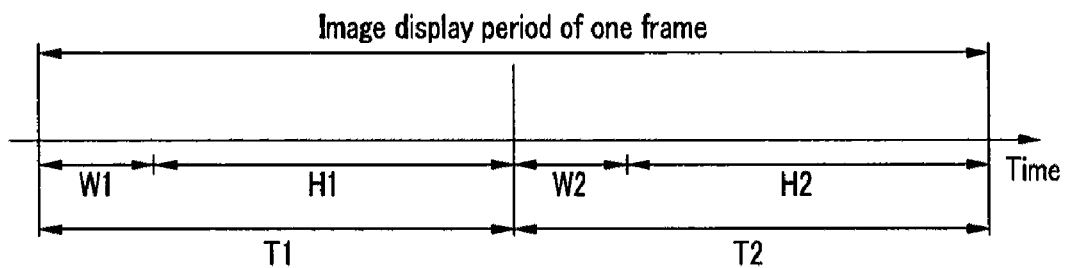
Figure 3B:
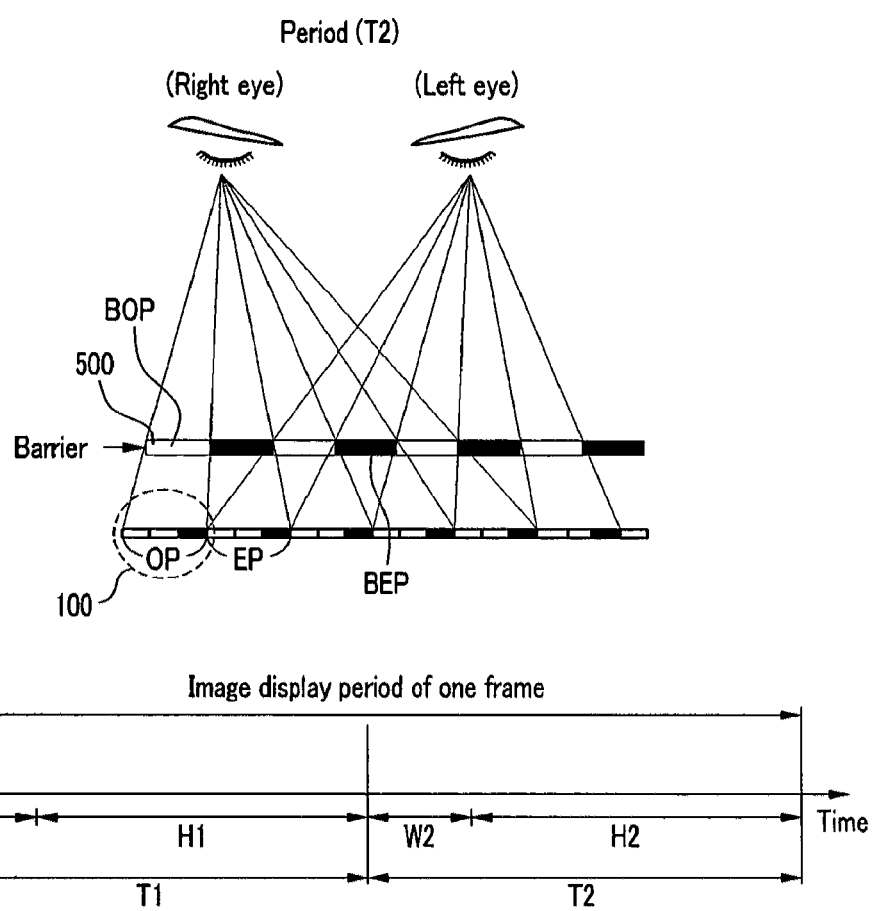

FIG. 3A and FIG. 3B illustrate a time-division driving method of a plane/stereoscopic image display device according to an exemplary embodiment.

The time division driving method may include: 1) a method in which a light source may be alternately operated at left and right sides, and the left and right sides may be divided according to time division by using an optical element including a combination of a prism and a lenticular lens; or 2) a method in which a slit in a liquid crystal barrier through which light passes may be divided into several sections and the divided slit sections may be moved in synchronization with a displayed image. The electronic imaging device according to the exemplary embodiment may be driven according to method 2. However, the inventive concept is not limited thereto, and when method 1 is used, an optical element, e.g., a combination of a light source, the prism, and the lenticular lens, instead of the liquid crystal barrier, may be used.

FIG. 3A and FIG. 3B illustrate the basic case of two eyes, but the inventive concept is not limited thereto. In an exemplary embodiment, R, G, and B color sub-pixels form a pixel 110 which may be the minimum image display unit, and the R, G, and B color sub-pixels may be disposed adjacent to each other. An image displayed by the plurality of pixels 110 may be projected to the left eye and the right eye through the barrier layer 500.

In FIG. 3A, an image (hereinafter referred to as a left-eye image) combined in an order of the left-eye image to the right-eye image may be displayed to a user during a period T1 when one frame may be driven while being divided into two periods including the first period T1 and the second period T2. In FIG. 3B, an image (hereinafter referred to as a right-eye image) combined in an order of the right-eye image to the left-eye image may be displayed to the user during the second period T2. The first period T1 and the second period T2 may be respectively divided into data writing periods W1 and W2 and sustain periods H1 and H2. New images may be displayed for the writing period, and when the writing of the new images is completed on the entire screen, the screen is maintained during a sustain period.

In the first period T1, an odd pixel (OP) of the display unit 100 of FIG. 3A may be a left-eye pixel and an even pixel (EP) thereof may be a right-eye pixel. In this case, the odd pixel (BOP) of the barrier layer 500 may be a non-transmission area and the even pixel (BEP) may be a transmission area. Then, as illustrated in FIG. 3A, paths for projecting the left-eye image to the left eye and the right-eye image to the right eye may be formed. The left-eye image projected from the odd pixel OP may be formed as an image having a predetermined disparity with respect to the right-eye image, and the right-eye image projected from the even pixel EP may be formed as an image having a predetermined disparity with respect to the left-eye image. Accordingly, when the user recognizes the left-eye image projected from the odd pixel OP and the right-eye image projected from the even pixel EP with his/her left and right eyes, he/she obtains depth information as if he/she looked at an actual solid target through his/her left and right eyes, perceiving a stereoscopic effect.

In FIG. 3B, an odd pixel OP of the display unit 100 may be the right-eye pixel and an even pixel EP may be the left-eye pixel. In this case, the odd pixel BOP of the barrier layer 500 may be a transmission area and the even pixel BEP of the barrier layer 500 may be a non-transmission area. Then, as shown in FIG. 3B, paths for projecting the left-eye image to the left eye and the right-eye image to the right eye may be formed. The right-eye image projected from the odd pixel OP may be formed as an image having a predetermined disparity with respect to the left-eye image, and the left-eye image projected from the even pixel EP may be formed as an image having a predetermined disparity with respect to the right-eye image. Accordingly, when the user recognizes the right-eye image projected from the odd pixel OP and the left-eye image projected from the even pixel EP with his/her right and left eyes, he/she obtains depth information as if he/she looked at an actual solid target through his/her right and left eyes, perceiving a stereoscopic effect.

In this manner, during the first period T1, the odd pixel is seen by a user's left eye while the even pixel is seen by the user's right eye, and during the second period T2, the odd pixel is seen by the user's right eye while the even pixel is seen by a user's left eye. Therefore, the user may view a stereoscopic image with resolution of a plane image. Since the barrier layer 500 according to the exemplary embodiment may include the plurality of first and second barrier electrodes arranged in the zigzag pattern, when a left-right image is written and displayed in a plurality of pixels connected to scan lines in one row, a right-left image may be written and displayed to a plurality of pixels connected to scan lines of at least one of adjacent rows. This will be described in more detail below with reference to a structure of the barrier layer 500.

Figure 4A:
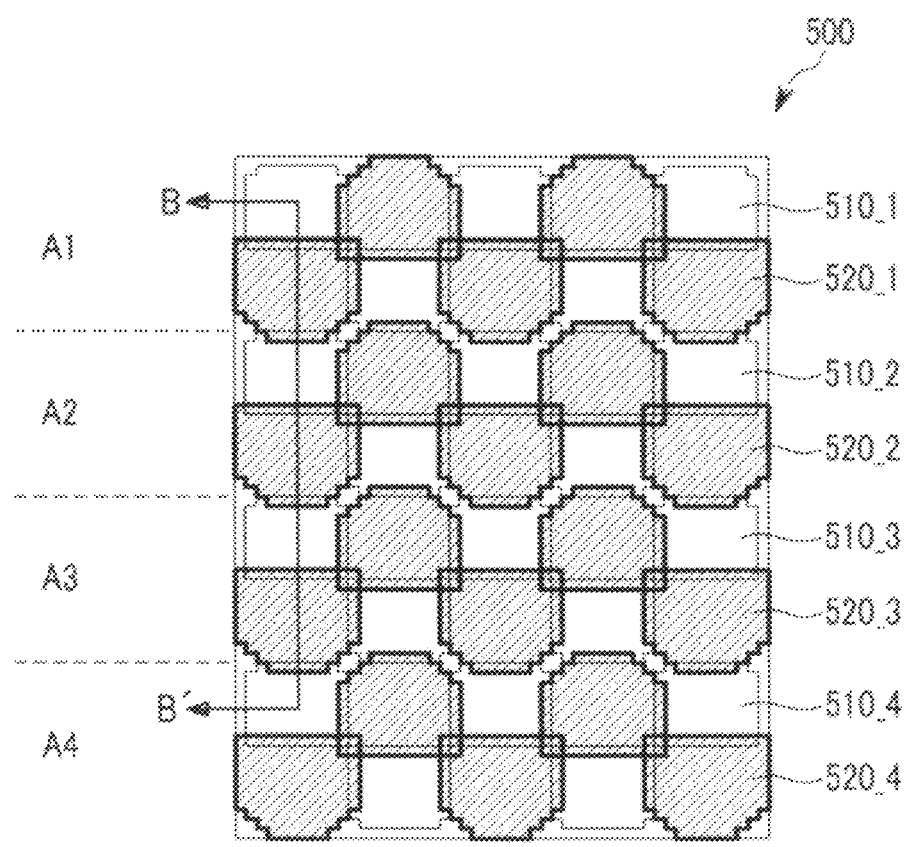
FIG. 4A to FIG. 4C illustrate schematic top plan views of a barrier layer according to an exemplary embodiment.
Figure 4B:
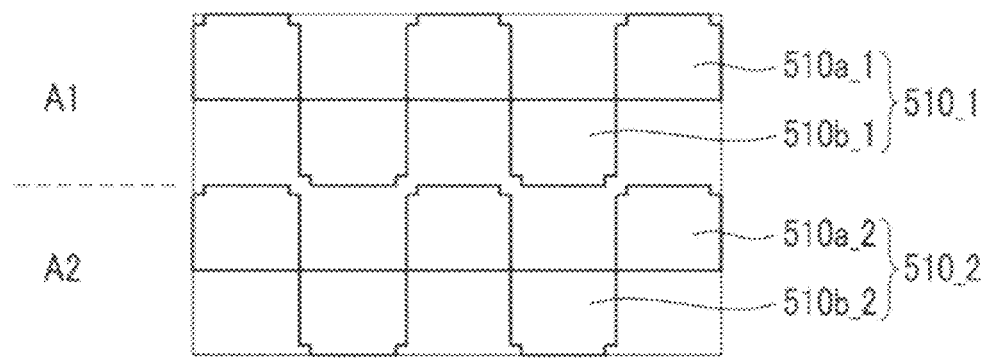
Figure 4C:
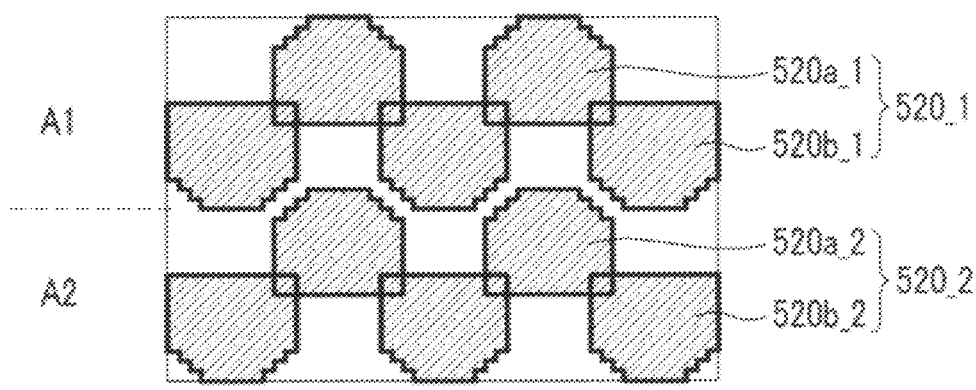

FIG. 4A to FIG. 4C illustrate top plan views of the barrier layer 500 according to an exemplary embodiment. FIG. 4A illustrates a partial top plan view of a relative arrangement of first and second barrier electrodes 510 and 520 in areas A1 through A4. FIG. 4B illustrates a partial top plan view of first barrier electrodes 510_1 and 510_2 in areas A1 and A2, and FIG. 4C illustrates a top plan view of second barrier electrodes 520_1 and 520_2 in areas A1 and A2.

Referring to FIG. 4A, the barrier layer 500 may be divided into a plurality of areas, e.g., first through fourth areas A1, A2, A3, and A4, such that a longitudinal direction of each area may extend along a longitudinal direction of a scan line direction of the display unit 100. Each area of the plurality of areas in the barrier layer 500 may include corresponding first and second barrier electrodes 510 and 520. For example, as illustrated in FIG. 4A, the barrier layer 500 may be divided into four areas, and may include a plurality of first barrier electrodes 510_1 to 510_4 and a plurality of second barrier electrodes 520_1 to 520_4. In addition, in the display unit 100 corresponding to the barrier layer 500 of FIG. 4A, a plurality of color pixels may be formed in an area where eight scan lines and twelve data lines cross. For example, three color sub-pixels of R, G, and B form one pixel 110, and each color sub-pixel may be connected to a corresponding data line, so a number of pixels 110 corresponding to twelve data lines may be four. However, this is for better understanding and ease of description, and the inventive concept is not limited thereto. The barrier layer 500 may be divided into four areas or more according to a resolution of the display unit 100. A number of pixels 110 may be determined according to the resolution, and the number of data lines may be determined according to the number of pixels 110. In addition, the barrier layer 500 may extend in a direction perpendicular to that of the data line according to the number of data lines.

The plurality of first barrier electrodes 510_1 to 510_4 and the plurality of second barrier electrodes 520_1 to 520_4 may be disposed on different layers for each of the areas A1, A2, A3, and A4. Each of the first barrier electrodes 510_1 to 510_4 and second barrier electrodes 520_1 to 520_4 may be formed in a zigzag pattern along the length direction of the scan lines $S_1$ to $S_n$. In FIGS. 4A and 4C, the plurality of second barrier electrodes 520_1 to 520_4 are electrodes marked by shadowing, as opposed to the first barrier electrodes 510_1 to 510_4. The plurality of first barrier electrodes 510_1 to 510_4 and the plurality of second barrier electrodes 520_1 to 520_4 that correspond to each other may be disposed in the same area, and the zigzag patterns of the plurality of first barrier electrodes 510_1 to 510_4 may be offset with respect to the zigzag patterns of the plurality of second barrier electrodes 520_1 to 520_4. The plurality of second barrier electrodes 520_1 to 520_4 may be disposed on a layer at a higher level than a layer where the plurality of first barrier electrodes 510_1 to 510_4 are disposed, as will be discussed in more detail below with reference to FIG. 5. However, relative heights of the first and second barrier layer electrodes 510 and 520 may be switched.

In further detail, referring to FIG. 4B, the first barrier electrode 510_1 may be formed in a plurality of rows (hereinafter "row" implies a length direction of the scan line), e.g., in at least two rows. For example, if the first barrier electrode 510_1 is formed in two rows, as illustrated in FIG. 4B, the first barrier electrode 510_1 may include a plurality of first sub-electrodes 510a_1 in a first row and a plurality of second sub-electrodes 510b_1 in a second row adjacent to the first row. As further illustrated in FIG. 4B, the plurality of first sub-electrodes 510a_1 in the first row may be separated from each other along the row direction by a first predetermined gap, and the plurality of second sub-electrodes 510b_1 in the second row may be separated from each other by a second predetermined gap. For example, the first and second predetermined gaps may be equal, so the gap between the plurality of first sub-electrodes 510a_1 and the gap between the plurality of second sub-electrodes 510b_1 may be equal to each other.

The plurality of second sub-electrodes 510b_1 in the second row may be offset along the row direction with respect to the first sub-electrodes 510a_1 in the first row, so each of the plurality of second sub-electrodes 510b_1 may be formed between two corresponding, e.g., adjacent, first sub-electrodes 510a_1 among the plurality of first sub-electrodes 510a_1 in the first row. For example, if the first and second predetermined gaps are equal, each of the plurality of second sub-electrodes 510b_1 may extend along, e.g., only along, the first predetermined gap. In other words, a second sub-electrode 510b_1 may be offset along the row direction by a length of a first sub-electrode 510a_1 along the row direction, so the first and second sub-electrodes 510a_1 and 510b_1 may not overlap along the row or column directions. For example, the first and second sub-electrodes 510a_1 and 510b_1 may be arranged in a zigzag pattern. As further illustrated in FIG. 4B, inner angular points of the first sub-electrodes 510a_1, i.e., inner corners of the first sub-electrodes 510a_1 facing the second sub-electrodes 510b_1, may contact inner corners of respective second sub-electrodes 510b_1, e.g., corners of two adjacent second sub-electrodes 510b_1. Therefore, the first and second sub-electrodes 510a_1 and 510b_1 may be electrically connected. It is noted that even though FIG. 4B illustrates a first barrier electrode 510_1 divided into two rows and having first and second sub-electrodes 510a_1 and 510b_1 thereof arranged in a zigzag format, other configurations of the first barrier electrode 510_1 are within the scope of the inventive concept. For example, the first barrier electrode 510_1 may be divided into a plurality of rows and the zigzag format may be repeated. The same configuration described above may be applied to the plurality of the first barrier electrodes 510_2 to 510_4 formed in respective areas A2, A3, and A4.

As further illustrated in FIG. 4B, the first and second electrodes 510_1 and 510_2 may be electrically disconnected from each other at a boundary of the areas A1 and A2. For example, in an exemplary embodiment, outer angular points between adjacent second sub-electrodes 510*b*_1 of the first electrode 510_1 and first sub-electrodes 510*a*_2 of the second electrode 510_2 may be concave, e.g., in a lattice pattern to divide the two electrodes. For example, as a method for dividing the second sub-electrode 510*b*_1 and the first sub-electrode 510*a*_2, portions of the angular points of the second sub-electrode 510*b*_1 may be removed, e.g., to be concave in the shape of "ךּ" and "ךּ", and portions of the angular points of the first sub-electrode 510*a*_2 may be removed to define a mirror-image with respect to the second sub-electrode 510*b*_1, e.g., to be concave in the shape of "L" and "⌐", in order to prevent contact between corners of the two electrodes. However, the exemplary embodiment is not limited thereto, e.g., only the angular points of the first sub-electrode 510*a*_2 may be formed to be concave in the shape of "L" and "⌐" or only the angular points of the second sub-electrode 510*b*_1 may be formed to be concave in the shape of "ךּ" and "ךּ".

In addition, the angular points of the electrodes may not be formed in the lattice format, and may be formed in any suitable format that does not electrically connect the first and second sub-electrodes 510*a*_2 and 510*b*_1. Therefore, the format may be changed according to a layout design. The first sub-electrode 510*a*_1 and the second sub-electrode 510*b*_1 in the area A1 may be simultaneously driven. The first and second sub-electrodes 510*a*_2 and 510*b*_2 in the area A2 may be electrically disconnected from the first and second sub-electrode 510*a*_1 and 510*b*_1 in the area A1. First sub-electrodes 510*a*_2 to 510*a*_4 may not contact respective second sub-electrodes 510*b*_1 to 510*b*_3 (510*a*_3, 510*a*_4, 510*b*_3, and 510*b*_4 not shown) at boundaries of the areas A2, A3, and A4 may not contact each other, so that they may be electrically disconnected. Therefore, the plurality of first barrier electrodes 510_1 to 510_4 located in the respective areas A1, A2, A3, and A4 may be electrically disconnected and separately driven.

Referring to FIG. 4C, the second barrier electrode 520_1 may be formed in a plurality of rows, e.g., at least two rows, and may include a plurality of third sub-electrodes 520*a*_1 formed in a first row and a plurality of fourth sub-electrodes 520*b*_1 formed in a second row. The plurality of third sub-electrodes 520*a*_1 may be separated from each other with a predetermined gap, and the plurality of fourth sub-electrodes 520*b*_1 may be separated from each other with a predetermined gap in a row next to the row where the plurality of third sub-electrodes 520*a*_1 is arranged. Each of plurality of third sub-electrodes 520*a*_1 may be formed between two corresponding fourth sub-electrodes 520*b*_1 among the plurality of fourth sub-electrodes 520*b*_1 at a different row to define a zigzag pattern as described previously with reference to the plurality of first barrier electrode 510_1. That is, the second barrier electrode 520_1 may be divided into two rows and the third sub-electrode 520*a*_1 and the fourth sub-electrode 520*b*_1 may be formed in the zigzag format, but it is not limited thereto, e.g., the second barrier electrode 520_1 may be divided into a plurality of rows and the zigzag format may be repeated.

As further illustrated in FIG. 4C, angular points of the third sub-electrodes 520*a*_1 and the angular points of the fourth sub-electrodes 520*b*_1 may overlap each other and may be electrically connected. The third sub-electrode 520*a*_1 and the fourth sub-electrode 520*b*_1 of the second barrier electrode 520_1 may be larger than the first sub-electrode 510*a*_1 and the second sub-electrode 510*b*_1 of the first barrier electrode 510_1, respectively, in terms of length, i.e., a distance along the column direction, and width, i.e., a distance along the row direction.

Figure 5:
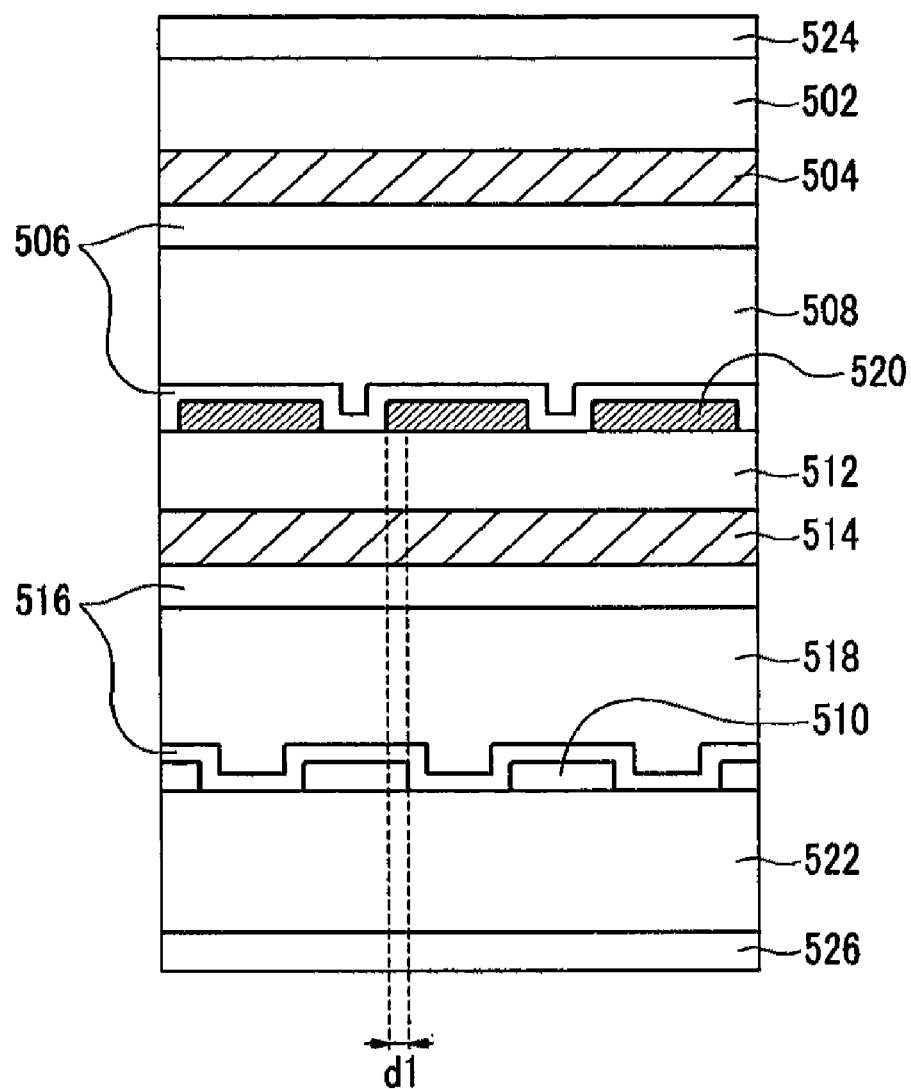
FIG. 5 illustrates a partial cross-sectional view of a barrier layer according to an exemplary embodiment.

Accordingly, when the second barrier electrodes 520 are arranged above the first barrier electrodes 510, as illustrated in FIG. 5, edges thereof may overlap. For example, as illustrated in FIG. 4A, the third sub-electrodes 520*a*_1 and the fourth sub-electrodes 520*b*_1 of the second barrier electrode 520 may overlap portions of adjacent first sub-electrodes 510*a*_1 and the second sub-electrodes 510*b*_1, thereby preventing or substantially minimizing pores from being formed between the first sub-electrode 510*a*_1 and the second sub-electrode 510*b*_1 and between the third sub-electrode 520*a*_1 and the fourth sub-electrode 520*b*_1. In other words, as illustrated in FIG. 4A, the first barrier electrodes 510 may be arranged to have each of the first barrier electrodes 510_1 to 510_4 offset along the row direction with respect to respective second barrier electrodes 520_1 to 520_4, so, e.g., edges of a first sub-electrode 510*a*_1 along the column direction may be overlapped by adjacent third sub-electrodes 520*a*_1 and an edge of the first sub-electrode 510*a*_1 along the row direction may be overlapped by a fourth sub-electrode 520*b*_1.

The arrangement of the first and second barrier electrodes 510 and 520 in two layers according to example embodiments may facilitate overlap of edges thereof. In contrast, a barrier unit having a single layer of electrodes may include gaps between adjacent electrodes and/or units, e.g., to provide electrical disconnections therebetween, thereby causing light leakage from the display unit during operation of the barrier unit and increase of crosstalk due to the light leakage, e.g., decreasing resolution of the displayed stereoscopic image.

In detail, according to example embodiments, the barrier unit 500 may be divided into a plurality of areas along the scan line direction, so each area may be driven selectively with synchronization of sequentially changed images. Each area may include zigzag patterned first and second barrier electrodes, so at least two corresponding sub-electrodes among a plurality of first and second barrier electrodes formed in a row direction, i.e., along the scan line, may be connected to each other, e.g., to have overlapping edges, so that pores, i.e., gaps, in the scan line direction may be prevented. Further, the sub-electrodes may be provided and arranged to prevent pores in the data line direction. In contrast, areas along data line direction, for example, may have visible boundaries between adjacent areas, so lines may be displayed on a screen. Further, when sub-electrodes do not have overlapping edges according to example embodiments, pores may be generated between the electrodes in the data line direction, e.g., due to manufacturing errors or arrangement process of the electrodes, thereby causing crosstalk.

In exemplary embodiments, however, the plurality of first and second barrier electrodes 510_1 to 510_4 and 520_1 to 520_4 may be formed in a zigzag pattern and arranged so margins, i.e., edges, thereof overlap in the row direction and the column direction. The margins, i.e., extended edges overlapping a portion of a corresponding sub-electrode, may be provided in the second barrier electrodes 520 as described above with respect to FIGS. 4A-4C and/or in the first barrier electrodes 510 (not shown). The description above regarding the third and fourth sub-electrodes 520*a*_1 and 520*b*_1 may be applied to the plurality of second barrier electrodes 520_2 to 520_4 located in the areas A2, A3, and A4. Since light leakage between the plurality of first barrier electrodes 510_1 to 510_4 and the plurality of second barrier electrodes 520_1 to 520_4 may be prevented when the barrier layer 500 is driven, generation of the crosstalk in realization of a stereoscopic image may be reduced.

In addition, the fourth sub-electrode 520*b*_1 and a third sub-electrode 520*a*_2 located at a boundary of the areas A1 and A2 may be electrically disconnected. In an exemplary embodiment, angular points between adjacent electrodes may be formed to be concave so as to separate the two electrodes. For example, as a method for separating the fourth sub-electrode 520*b*_1 and the third sub-electrode 520*a*_2, for example, the angular points of the fourth sub-electrode 520*b*_1 and the third sub-electrode 520*a*_2 may be formed in a step shape to prevent contact therebetween. The exemplary embodiment is not limited thereto, e.g., only the angular points of the third sub-electrode 520*a*_2 may be formed to be concave in the shape of " L " and " ↲ ", e.g., as described previously with reference to the first barrier electrodes 510, or only the angular points of the fourth sub-electrode 520*b*_1 may be concave in the shape of " ⌐ " and " ⌐ ". In addition, the angular points of the electrodes may not be formed in the lattice format, and may be formed in any format that does not electrically connect the third sub-electrode 520*a*_2 and the fourth sub-electrode 520*b*_1. Therefore, the format may be changed according to a layout design. The third sub-electrode 520*a*_1 and the fourth sub-electrode 520*b*_1 in the area A1 may be simultaneously driven, and the third sub-electrode 520*a*_2 and a fourth sub-electrode 520*b*_2 driven in the area A2 may be electrically disconnected from the third sub-electrode 520*a*_1 and the fourth sub-electrode 520*b*_1 in the area A1. The third and fourth sub-electrodes 520*a*_2 to 520*a*_4 and 520*b*_2 to 520*b*_4 (520*a*_3, 520*a*_4, 520*b*_3, and 520*b*_4 not shown) located in boundaries of the areas A2-A4 may not contact each other, so that they may be electrically disconnected. Therefore, the plurality of the second barrier electrodes 520_1 to 520_4 in the respective areas A1-A4 may be electrically disconnected and separately driven.

FIG. 5 illustrates a partial cross-sectional view of the barrier layer 500 according to the exemplary embodiment. FIG. 5 illustrates a view taken along line B-B' of FIG. 4A.

Referring to FIG. 5, the barrier layer 500 may include a first substrate 502, a second substrate 512, and a third substrate 522 that may be arranged opposite to each other with a predetermined distance therebetween. A first liquid crystal layer 508 may be disposed between the first and second substrates 502 and 512, and a second liquid crystal layer 518 may be disposed between the second and third substrates 512 and 522. A first common electrode 504 may be formed on a bottom surface of the first substrate 502 to face the first liquid crystal layer 508, and a second common electrode 514 may be formed on a bottom surface of the second substrate 512 to face the second liquid crystal layer 518. The first barrier electrode 510 may be formed on a top surface of the third substrate 522 to face the second liquid crystal layer 518, and the second barrier electrode 520 may be formed on a top surface of the second substrate 512 to face the first liquid crystal layer 508. The first common electrode 504 may be formed under the entire effective surface of the first substrate 502, e.g., to overlap an entire area of the first substrate 502, and the second common electrode 514 may be formed under the entire effective surface of the second substrate 512, e.g., to overlap an entire area of the second substrate 512. The first and second common electrodes 504 and 514 and the first and second electrodes 510 and 520 may be formed as transparent conductive layers.

As further illustrated in FIG. 5, first alignment layers 506 may be respectively provided on each of the first common electrode 504 and the second barrier electrode 520 to face the first liquid crystal layer 508, e.g., the first alignment layer 506 may be between the second barrier electrode 520 and the first liquid crystal layer 508. Second alignment layers 516 may be respectively provided on each of the second common electrode 514 and the first barrier electrode 510 to face the second liquid crystal layer 518. A first polarizing plate 524 and a second polarizing plate 526 may be respectively formed on an upper side of the first substrate 502 and on a lower side of the third substrate 522. The first alignment layers 506 and the second alignment layers 516 may align liquid crystal materials forming the first and second liquid crystal layers 508 and 518 in a specific direction, respectively. The first and second liquid crystal layers 508 and 518 may be formed of twisted nematic (TN)-type liquid crystal. The TN-type liquid crystal may have a twist angle of about 90° when no voltage is applied thereto. The first barrier electrode 510 and the second barrier electrode 520 may be arranged to not face each other, i.e., to be offset. Therefore, since sub-electrodes of the second barrier electrode 520 may be longer than sub-electrodes of the first barrier electrode 510 by a predetermined length, respective ends of one second barrier electrode 520 may overlap edges of adjacent first barrier electrodes 510 therebelow by a width $d_1$, as illustrated in FIG. 5.

In the exemplary embodiment, the first and second liquid crystal layers 508 and 518 may be formed of TN-type liquid crystal, and a polarizing axis of the first polarizing plate 524 and a polarizing axis of the second polarizing plate 526 may be parallel to each other. Therefore, an axis of light that is linearly polarized by the second polarizing plate 526 may be twisted by about 90° when passing through the second liquid crystal layer 518 and then twisted by about 90° again when passing through the first liquid crystal layer 508 so that the linearly polarized light may pass through the first polarizing plate 524. Accordingly, the barrier layer 500 may be entirely transmissive when no voltage is applied, i.e., a normally white mode.

Therefore, when a voltage higher than a voltage difference operating liquid crystals between the first common electrode 504 and the second barrier electrode 520 is applied, the first liquid crystal layer 508 may be perpendicularly arranged along the thick direction of the barrier layer 500, i.e., along a direction parallel to a line connecting the first and second barrier electrodes 510 and 520. In this case, since no voltage is applied to the second common electrode 514 and the first barrier electrode 510, the light linearly polarized by the second polarizing plate 526 may be twisted by about 90° when passing through the second liquid crystal layer 518. In addition, the 90° twisted light maintains the polarizing axis while passing through the first liquid crystal layer 508, so that it may not pass through the first polarizing plate 524. Consequently, an area where the second barrier electrode 520 is located becomes a non-transmission area. Likewise, when a predetermined voltage is applied between the second common electrode 514 and the first barrier electrode 510, an area where the first barrier electrode 510 is located may become a non-transmission area.

Figure 6:
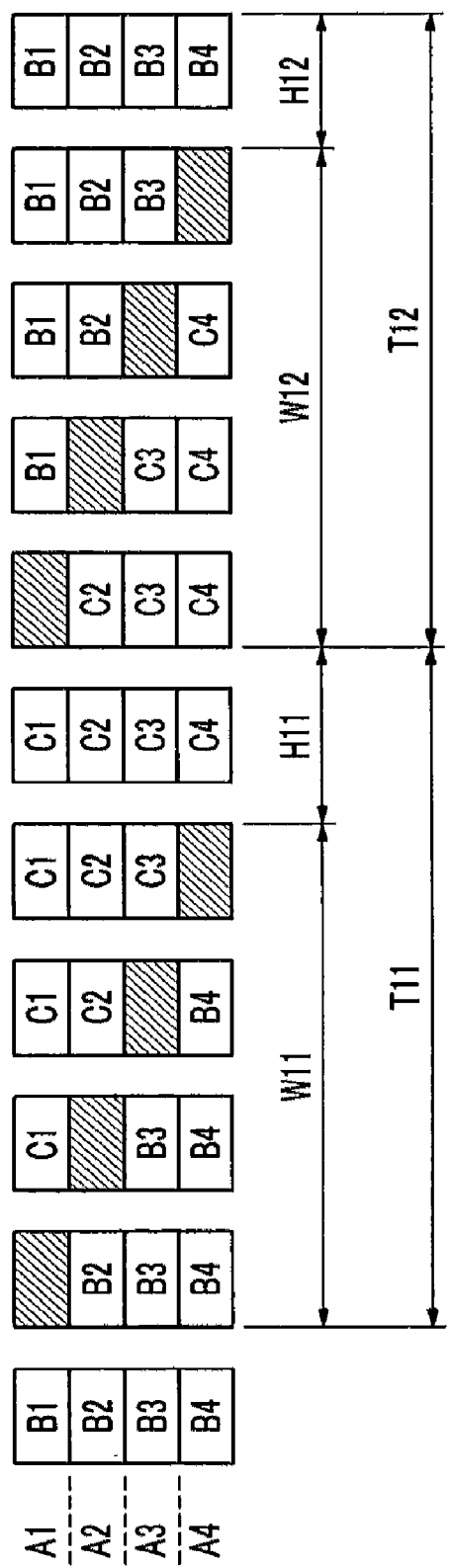
FIG. 6 illustrates a schematic diagram of a driving method of an electronic imaging device according to an exemplary embodiment.

FIG. 6 illustrates a schematic diagram of a driving method of an electronic imaging device according to an exemplary embodiment, and shows where images may be displayed according to an area of the display unit 100 and the barrier layer 500, and a state of the barrier layer 500. It is noted that FIG. 6 illustrates only one frame period for better understanding and ease of description. The frame is divided into a period T11 and a period T12. Here, the period T11 may be alternately displayed in an order of a left-right image LR and a right-left image RL along a scan direction. The period T11 may be divided into a writing period W11 and a sustain period H11. During the period T11, areas corresponding to a plurality of the first barrier electrodes 510_1 to 510_4 may be non-transmission areas, so that images displayed in the order of the left-right image LR and the right-left image RL may be divided and projected to the left eye and the right eye of a user.

That is, the barrier layer 500 may project the left-right image LR to the user when areas corresponding to the plurality of first sub-electrodes 510a_1 to 510a_4 are non-transmissive, and may project the right-left image RL to the user when areas corresponding to the second sub-electrodes 510b_1 to 510b_4 are non-transmissive.

The period T12 may be alternately displayed in an order of the right-left image RL and the left-right image LR along the scan direction. The period T12 may be divided into a writing period W12 and a sustain period H12. During the period T12, a plurality of the second barrier electrodes 520_1 to 520_4 may become non-transmission areas, so that the image divided in the order of the right-left image RL and the left-right image LR may be projected respectively to the left eye and the right eye of the user. That is, the barrier layer 500 may project the right-left image RL to the user when areas corresponding to the plurality of third sub-electrodes 520a_1 to 520a_4 are non-transmissive, and may project the left-right image LR to the user when areas corresponding to the plurality of fourth sub-electrodes 520b_1 to 520b_4 are non-transmissive.

In addition, in FIG. 6, when the plurality of the first barrier electrodes 510_1 to 510_4 are non-transmission areas and the left-right image LR and the right-left image RL are displayed from the top of the display unit 100 to the bottom thereof, images respectively displayed in areas A1, A2, A3, and A4 are marked as B1, B2, B3, and B4. Therefore, the images B1, B2, B3, and B4 may be images respectively displayed in an order of the left-right image LR and the right-left image RL. On the contrary, when the plurality of second barrier electrodes 520_1 to 520_4 are non-transmission areas and the right-left image RL and the left-right image LR are displayed from the top of the display unit 100 to the bottom thereof, images displayed in the areas A1, A2, A3, and A4 may be respectively marked as C1, C2, C3, and C4. Therefore, images C1, C2, C3, and C4 are images respectively displayed in an order of the right-left image RL and the left-right image LR.

Figure 7:
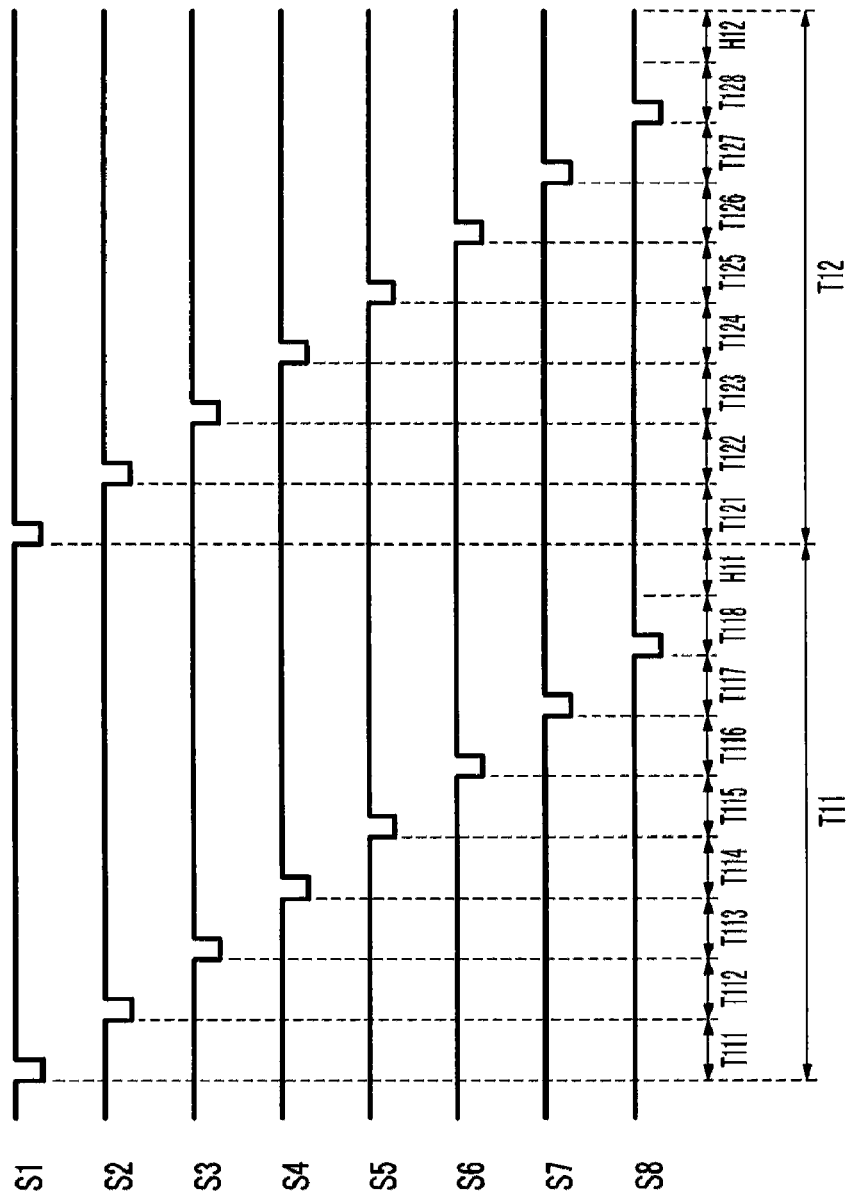
FIG. 7 illustrates scan signals S1 to S8 transmitted to a display unit according to an exemplary embodiment.

FIG. 7 illustrates scan signals $S_1$ to $S_8$ transmitted to the display unit 100 according to the exemplary embodiment. The scan signals $S_1$ to $S_8$ may be sequentially activated, and images may be synchronized at an activation time of each of the scan signals $S_1$ to $S_8$ and displayed on the display unit 100. It is assumed in the exemplary embodiment that the plurality of first barrier electrodes 510_1 to 510_4 and the plurality of second barrier electrodes 520_1 to 520_4 are non-transmission areas when a predetermined driving voltage is applied.

First, operations during the writing period W11 are as follows. Referring to FIGS. 6 and 7, the images B1, B2, B3, and B4 may be respectively maintained in the plurality of areas A1, A2, A3, and A4 in a previous frame. When the scan signal $S_1$ is applied during a period T111, the right-left image RL may be written in the first row of the area A1. In this case, the right-left image RL may be written in a plurality of pixels 110 to which the scan signal $S_1$ is transmitted in the area A1. However, since an area that corresponds to the first barrier electrode 510_1 is a non-transmission area in the area A1, the barrier layer 500 corresponding to the scan signal $S_1$ may project the left-right image LR, i.e., the barrier layer 500 may project no written image during the period T111. If an area corresponding to the second barrier electrode 520_1 is a non-transmission area at an application time of the scan signal $S_1$, the barrier 500 may not project the right-left image RL since the right-left image RL has been written in a plurality of pixels 110 connected to a scan line to which the scan signal $S_1$ is applied. As described, when the written image and the barrier layer 500 are inappropriate to each other, a deteriorated screen may be provided to the user. Therefore, according to example embodiments, the areas A1, A2, A3, and A4 of the barrier layer 500 may be non-transmission areas while new image is written in areas of the display unit 100 corresponding to the areas A1, A2, A3, and A4, thereby preventing the deteriorated screen from being provided to the user. That is, the barrier layers 500 of the areas A1, A2, A3, and A4 may be synchronized at an application time of the first scan signal to the areas of the display unit 100 corresponding to the areas A1, A2, A3, and A4, and then may become non-transmission areas.

Next, when the scan signal $S_2$ is applied during a period T112, the left-right image LR may be written in the second row of the area A1. When the writing of the left-right image LR is finished, an area corresponding to the first barrier electrode 510_1 may become a non-transmission area.

When the scan signal $S_3$ is applied during a period T113, the right-left image RL may be written in the first row of the area A2. In this case, the barrier layer 500 of the area A2 may become a non-transmission area so that an image of the area A2 may be blocked. When the scan signal $S_4$ is applied during a period T114, the left-right image LR may be written in the second row of the area A2. When the writing of the left-right image LR is finished, an area corresponding to the first barrier electrode 510_2 of the area A2 may become a non-transmission area.

When the scan signal $S_5$ is applied during a period T115, the right-left image RL may be written in the first row of the area A3. In this case, the barrier layer 500 of the area A3 may become a non-transmission area so that an image of the area A3 may be blocked. When the scan signal $S_6$ is applied during a period T116, the left-right image LR may be written in the second row of the area A3. When the writing of the left-right image LR is finished, an area corresponding to the first barrier electrode 510_3 of the area A3 may become a non-transmission area.

When the scan signal $S_7$ is applied during a period T117, the right-left image RL may be written in the first row of the area A4. In this case, the barrier layer 500 of the area A4 may become a non-transmission area so that an image of the area A4 may be blocked. When the scan signal $S_8$ is applied during a period T118, the left-right image LR may be written in the second row of the area A4. When the writing of the left-right image is finished, an area corresponding to the first barrier electrode 510_4 may become a non-transmission area.

Operation during the writing period W12 will now be described. When the scan signal $S_1$ is applied during a period T121, the left-right image LR may be written in the first row of the area A1. In this case, the barrier layer 500 of the area A1 becomes a non-transmission area so that the image of the area A1 may be blocked. When the scan signal $S_2$ is applied during a period T122, the right-left image RL may be written in the second row of the area A1. When the writing of the right-left image RL is finished, an area corresponding to the second barrier electrode 520_1 of the area A1 may become a non-transmission area.

When the scan signal $S_3$ is applied during a period T123, the left-right image LR may be written in the first row of the area A2. In this case, the barrier layer 500 of the area A2 becomes a non-transmission area so that the image of the area A2 may be blocked. When the scan signal $S_4$ is applied during a period T124, the right-left image RL may be written in the second row of the area A2. When the writing of the right-left image RL is finished, an area corresponding to the second barrier electrode 520_2 of the area A2 becomes a non-transmission area. When the scan signal $S_5$ is applied during a period T125, the left-right image LR may be written in the first row of the area A3. In this case, the barrier layer 500 of the area A3 becomes a non-transmission area so that the image of the area A3 may be blocked. When the scan signal $S_6$ is applied during a period T126, the right-left image RL may be written in the second row of the area A3. When the writing of the right-left image RL is finished, an area corresponding to the second barrier electrode 520_3 of the area A3 may become a non-transmission area.

When the scan signal $S_7$ is applied during a period T127, the left-right image LR may be written in the first row of the area A4. In this case, the barrier layer 500 of the area A4 becomes a non-transmission area so that the image of the area A4 may be blocked. When the scan signal $S_8$ is applied during a period T128, the right-left image RL may be written in the second row of the area A4. When the writing of the right-left image RL is finished, an area corresponding to the second barrier electrode 520_4 of the area A4 becomes a non-transmission area.

Figure 8:
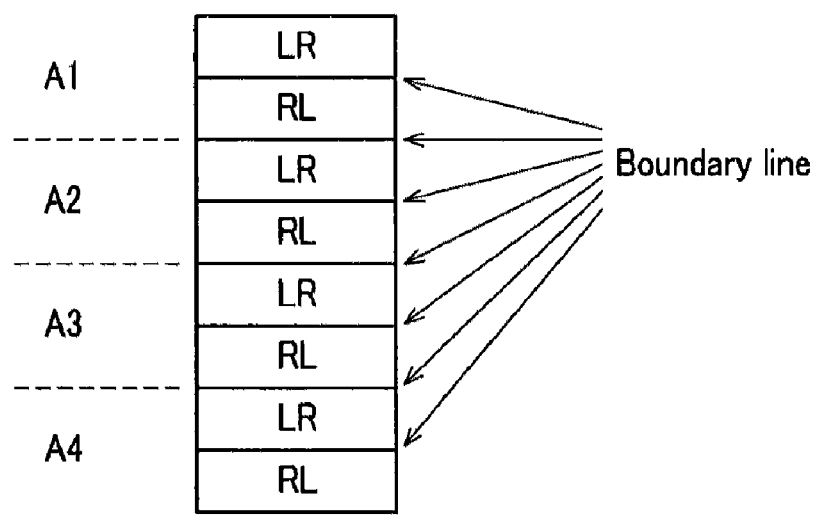
FIG. 8 illustrates a schematic diagram of a display arrangement of images according to an exemplary driving method of an electronic imaging device.

As described above, in the first exemplary embodiment, the plurality of first barrier electrodes 510_1 to 510_4 and the plurality of second barrier electrodes 520_1 to 520_4 may be respectively formed in two rows with a zigzag pattern so that the left-right image LR and the right-left image RL may be adjacent each other when displayed. In other words, as illustrated in FIG. 8, the left-right image LR and the right-left image RL may be arranged in an alternating pattern, so a right-left image RL may be displayed between two left-right images LR in all the areas A1, A2, A3, and A4. As such, there may be seven boundary lines between LR and RL images in the areas A1, A2, A3, and A4 when the viewer views the display unit 100.

Figure 9:
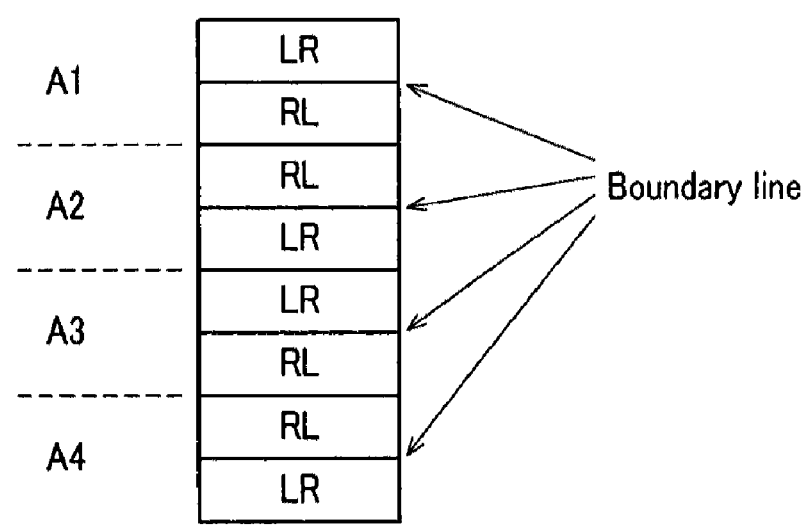
FIG. 9 illustrates a schematic diagram of a display arrangement of images of a driving method of an electronic imaging device according to another exemplary embodiment.

FIG. 9 illustrates a schematic view for description of a driving method of an electronic imaging device according to another exemplary embodiment. Referring to FIG. 9, the image displaying order in the driving method of FIG. 7 may be changed, while the operation is the same as that of FIG. 6. Briefly, as shown in FIG. 9, when a left-right image LR and a right-left image RL are sequentially written in an area A1, the right-left image RL and the left-right image LR are sequentially written in an area A2 in the second exemplary embodiment. Further, the left-right image LR and the right-left image RL may be sequentially written in an area A3, and the right-left image RL and the left-right image LR may be sequentially written in an area A4. That is, the same image may be continuously displayed so that a total number of boundary lines between RL and LR images in the areas A1, A2, A3, and A4 may be reduced, i.e., only four, as compared to the image display illustrated in FIG. 8, thereby improving image resolution even further.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An electronic imaging device, comprising:
   a display unit including a plurality of scan lines, a plurality of data lines, and a plurality of pixels; and
   a barrier layer disposed in front of the display unit and divided into a plurality of areas, a longitudinal side of an area of the plurality of areas extending along a scan direction in which a scan signal is transmitted to the plurality of scan lines,
   wherein the barrier layer includes:
   a plurality of first barrier electrodes disposed on a first layer and including a plurality of first and second sub-electrodes, the first and second sub-electrodes being arranged in a zigzag pattern along the scan direction, and
   a plurality of second barrier electrodes disposed on a second layer and including a plurality of third and fourth sub-electrodes, the third and fourth sub-electrodes being arranged in a zigzag pattern along the scan direction and offset with respect to the first and second sub-electrodes along the scan direction, and the second layer being different from the first layer.

2. The electronic imaging device as claimed in claim 1, wherein edges of the first barrier electrode and edges of the second barrier electrode overlap.

3. The electronic imaging device as claimed in claim 1, wherein the plurality of first sub-electrodes is in a first row and the plurality of second sub-electrodes is in a second row that is adjacent to the first row.

4. The electronic imaging device as claimed in claim 3, wherein the plurality of first sub-electrodes and the plurality of second sub-electrodes disposed in a first area among the plurality of areas are electrically connected to each other.

5. The electronic imaging device as claimed in claim 4, wherein the plurality of first sub-electrodes are separated from each other by a first predetermined gap along the first row direction, the plurality of second sub-electrodes are separated from each other by the first predetermined gap along the second row direction, and the second sub-electrodes contact corners of two corresponding first sub-electrodes among the plurality of first sub-electrodes.

6. The electronic imaging device as claimed in claim 4, wherein the plurality of first sub-electrodes is disposed in a second area adjacent to the first area among the plurality of areas, and the plurality of second sub-electrodes in the first area is electrically disconnected from the first sub-electrodes in the second area.

7. The electronic imaging device as claimed in claim 6, wherein corners of the plurality of second sub-electrodes in the first area facing the second area are concave, corners of the plurality of first sub-electrodes in the second area facing the first area are concave, shapes of the corners of the second sub-electrodes in the first area and first sub-electrodes in the second area being mirror images of each other.

8. The electronic imaging device as claimed in claim 6, wherein corners of the plurality of first sub-electrodes in the second area facing the first area are concave in a shape of "⌊" and "⌋".

9. The electronic imaging device as claimed in claim 6, wherein corners of the plurality of second sub-electrodes in the first area facing the second area are concave in the shape of "⌉" and "⌈".

10. The electronic imaging device as claimed in claim 4, wherein the plurality of third sub-electrodes is formed in the first row and the plurality of fourth sub-electrodes is formed in the second row.

11. The electronic imaging device as claimed in claim 10, wherein the plurality of third sub-electrodes and fourth sub-electrodes in the first area among the plurality of areas are electrically connected to each other.

12. The electronic imaging device as claimed in claim 11, wherein the plurality of third sub-electrodes are separated from each other by a second predetermined gap along the first row direction, the plurality of fourth sub-electrodes are separated from each other by the second predetermined gap along the second row direction, and the fourth sub-electrodes overlap corners of two corresponding third sub-electrodes among the plurality of third sub-electrodes.

13. The electronic imaging device as claimed in claim 12, wherein the plurality of third sub-electrodes in a second area adjacent to the first area among the plurality of areas and the plurality of fourth sub-electrodes in the first area are electrically disconnected from each other.

14. The electronic imaging device as claimed in claim 13, wherein corners of the plurality of fourth sub-electrodes in the first area facing the second areas and corners of the plurality of third sub-electrodes in the second area facing the first area are formed in a step shape.

15. The electronic imaging device as claimed in claim 13, wherein corners of the plurality of third sub-electrodes in the second area facing the first area are concave in a shape of "⌊" and "⌈".

16. The electronic imaging device as claimed in claim 13, wherein corners of the plurality of fourth sub-electrodes in the first area facing the second areas are concave in a shape of "⌋" and "⌉".

17. The electronic imaging device as claimed in claim 1, wherein the barrier layer further comprises:
   first and second substrates facing each other with a first liquid crystal therebetween;
   a third substrate facing the second substrate, a second liquid crystal layer being between the second and third substrates;
   a first common electrode over an entire bottom surface of the first substrate; and
   a second common electrode over an entire bottom surface of the second substrate.

18. The electronic imaging device as claimed in claim 17, wherein the plurality of first barrier electrodes is on an upper surface of the second substrate.

19. The electronic imaging device as claimed in claim 17, wherein the plurality of second barrier electrodes is on the upper surface of the third substrate.

* * * * *